United States Patent [19]

Penczek et al.

[11] Patent Number: 4,607,085

[45] Date of Patent: Aug. 19, 1986

[54] PROCESS FOR THE PRODUCTION OF POLYPHENYLENE-OXIDE

[75] Inventors: Irena Penczek; Jan Bialy; Zbingniew Dobkowski, all of Warsaw, Poland

[73] Assignee: Enichimica S.p.A., Milan, Italy

[21] Appl. No.: 677,167

[22] Filed: Dec. 3, 1984

[30] Foreign Application Priority Data

Dec. 5, 1983 [IT] Italy ............................... 24026 A/83

[51] Int. Cl.$^4$ ............................................. C08G 65/44
[52] U.S. Cl. ........................................ 526/59; 526/60; 528/212; 528/214; 528/215; 528/216; 528/217; 528/218
[58] Field of Search .................... 526/59, 60, 67, 68; 528/212, 214–218

[56] References Cited

U.S. PATENT DOCUMENTS

| | | | |
|---|---|---|---|
| 3,503,937 | 3/1970 | Allen et al. | 526/59 |
| 4,196,278 | 4/1980 | Bennett, Jr. et al. | 528/212 |
| 4,211,857 | 7/1980 | Sugio et al. | 526/60 |

*Primary Examiner*—Lester L. Lee

[57] ABSTRACT

Process for the production of polyphenyleneoxide, in which:

oxygen, or a gas containing molecular oxygen is fed into a liquid reaction medium, solvent of the 2,6-xylenol and of the catalyst cupric salt complexed with an organic base, but nor solvent or substantially not solvent of the polyphenyleneoxide;

from time to time samples are collected of the reaction mixture, said samples are treated with a liquid solvent, capable of dissolving polyphenyleneoxide and of stopping the growth of the macromolecules, until a clear and homogeneous solution is obtained;

the through time of the so obtained solution is measured in a capillary tube viscometer and the value is determined of the viscosity and/of the molecular weight of polyphenyleneoxide by the comparison with standard values; and on the basis of the so determined value of the viscosity and/or of the polyphenyleneoxide molecular weight interventions are effected on the oxidative polymerizing reaction of 2,6-xylenol.

6 Claims, No Drawings

PROCESS FOR THE PRODUCTION OF POLYPHENYLENE-OXIDE

The present invention relates to an improved process for the production of polyphenyleneoxide, by means of the oxidative polymerizing of 2,6-xylenol.

Polyphenyleneoxide is a valuable thermoplastic polymer, used in several applications, which is obtained in the art by means of the oxidative polymerizing of 2,6-xylenol. Generally, such polymerization is carried out with oxygen, using a catalyst of cupric salt complexed with an organic base, in a liquid reaction medium in which the polyphenyleneoxide precipitates which is formed.

In the preparation of polyphenyleneoxide problems exist relating to the control in time of the polymerization degree of 2,6-xylenol, said control being required to the purpose of obtaining a polyphenyleneoxide having a molecular weight ranging within a desired range of values.

According to the presently known art, the course of the oxidative polymerization of 2,6-xylenol is controlled by measuring the volume of oxygen absorbed with time, or by determining, especially by chromatographic processes, the decrease with time of the concentration of 2,6-xylenol in the reaction mixture. This operating way, although it has the advantage of a quite quick execution, allows only the rate of the polymerizing reaction to be checked, but does not give any precise indications as for the molecular weight of the polyphenylene oxide being produced.

Still methods are known in the art for checking the course of the polymerization of 2,6-xylenol, based upon viscosimetric measurements of polyphenyleneoxide. According to such known methods, samples are collected at different times of the reaction mixture, the catalyst is deactivated, the samples are washed, dried, and polymer is weighed with an accuracy of 0.0002 g. The weighed polymer is then dissolved in a solvent, and the value is measured of the viscosity of the solution. This method allows the molecular weight of the polyphenyleneoxide to be checked, but it requires so long times for being carried out (of the order of 1-2 hours) that it does not allow any efficacious interventions on the polymerization reaction of 2,6-xylenol.

In existed therefore in the art the demand for a process to be provided for the oxidative polymerization of 2,6-xylenol, in which it was possible to check the progress with time of the molecular weight of polyphenyleneoxide, in a way quick enough to allow an efficacious intervention on the polymerization reaction.

Such a demand is fulfilled by means of the process according to the present invention, according to which polyphenyleneoxide is prepared:

by feeding oxygen, or a gas containing molecular oxygen, into a liquid reaction medium, which is a solvent of 2,6-xylenol and of the catalyst of cupric salt complexed with an organic base, but is not solvent or substantially not solvent of polyphenyleneoxide;

by collecting during the time samples of the reaction mixture, treating said samples with a liquid solvent capable of dissolving polyphenyleneoxide and of stopping the growth of its macromolecules, until a clear and homogeneous solution is obtained;

by measuring the passage time of the solution so obtained through a capillary tube viscometer, and determining the value of the viscosity and/or the molecular weight of the polyphenyleneoxide, by means of the comparison with standard values; and by intervening on the reaction of oxidative polymerizing of 2,6-xylenol on the basis of the so measured value of the viscosity and/or the molecular weight of polyphenyleneoxide.

The catalyst used for the oxidative polymerization of 2,6-xylenol is generally cupric chloride, complexed with an organic base, e.g., pyridine.

The liquid medium used for said polymerization is capable of dissolving 2,6-xylenol, in addition to the complexed catalyst, whilst it is incapable, or substantially incapable, of dissolving polyphenyleneoxide. As the liquid medium a mixture may e.g. be used of an aromatic hydrocarbon and an aliphatic alcohol, such as toluene and ethyl alcohol.

The temperature of the polymerization reaction is usually held at values lower than 30° C.

The liquid solvent required for dissolving polyphenyleneoxide must also be capable of stopping the growth of polyphenyleneoxide macromolecules, and of producing a clear and homogeneous solution. The stopping effect of the growth of the macromolecules of polyphenyleneoxide can also be exerted by said liquid solvent by means of its binding with the ends of the macromolecules, or by decomposing, or in any way deactivating the catalyst.

Examples of liquid solvents suitable to this purpose are chlorinated aliphatic hydrocarbons, or mixtures of aromatic hydrocarbons with organic or mineral acids. Specific examples are trichloroethylene, chloroform and liquid aromatic hydrocarbons containing at least 1% by weight of acetic acid or of hydrochloric acid.

Conveniently, a quantity of such a liquid solvent is used of from 5 to 20 parts by volume, and preferably of about 10 parts by volume, per each part by volume of sample collected from the reaction mixture. After having mixed the liquid solvent and the collected sample, the mixture is agitated, operating preferably at room temperature, or at temperatures close to room temperature (20°-25° C.), until a clear and homogeneous solution is obtained, on which the viscosimetric measurements are carried out.

The viscosimetric measurements are carried out in a capillary tube viscometer, of the Ubbelhode type or of similar types, the viscometer capillary tube having been preliminarly calibrated with samples obtained by carrying out a polymerization reaction under standard conditions.

In particular, for a correct execution of the measurement, it is necessary to select a capillary tube of such dimensions (diameter and length) as to allow the through flow of the solvent, with no polymer dissolved therein, in a time of not less than about 43 seconds.

The viscosimetric measurements moreover are conveniently carried out at room temperature, or at temperatures close to room temperature, e.g., of 23°±0.2° C.

As the result of such a calibration, standard data is obtained, e.g., in the form of a chart, which correlates the through flow times of polymer solutions through the capillary tube, to the values of viscosity and/or of molecular weight of the same polymer.

During the progress of the oxidative polymerization of 2,6-xylenol, the viscosity increases of the solutions of the samples, collected at different times, in the related selected liquid solvent, and the time of passage consequently increases of the same solutions through the capillary tube of the viscometer. As a result, it becomes it possible to correlate the through time through the capillary tube, to the increase of polyphenyleneoxide molecular weight, and to obtain a control of the oxidative polymerization reaction of 2,6-xylenol which is precise and so quick (execution time of about 3 to 8 minutes), that an efficacious intervention is allowed on the same reaction.

The following Experimental Examples are illustrative, and are not to be constructed as limitative of the invention.

EXAMPLE 1

In a polymerization reactor

| | |
|---|---|
| toluene | 190 parts by weight |
| ethanol | 50 parts by weight |
| cupric chloride | 0.15 parts by weight |
| morpholine | 8 parts by weight | are introduced.

The mixture is brought at 25° C., and gaseous oxygen is bubbled through it.

The adding is then started in a slow and gradual way, of 2,6-xylenol (38 parts by weight), while controlling the temperature at values lower than about 30° C.

After having completed the addition of 2,6-xylenol, samples of the reaction mixture are collected, of 2 ml each, every 30 minutes. To each collected sample 20 ml of chloroform are added, and the mixture is agitated till to the complete dissolving of polyphenyleneoxide, and to the obtainment of a clear and homogeneous solution.

A share of the so obtained solution is introduced in a Ubbelhode viscometer No. 1, thermostatized at 23°±0.2° C., and the through time is measured of the solution being examined through the capillary tube of the viscometer. The passage time of the solvent, for this particular viscometer type, is higher than 43 seconds.

In the following Table 1 the passage times are reported through the viscometer capillary tube of the solutions obtained from samples collected from the reaction mixture, at regular time intervals, after having completed the addition of 2,6-xylenol. In the same table, also the corresponding values are shown of the intrinsic viscosity of polyphenyleneoxide, obtained from standard data.

TABLE 1

| Sample No | Polymerization time from the completion of 2,6-xylenol addition (minutes) | Passage time of sample solution (seconds) | Intrinsic viscosity of polyphenyleneoxide (dl/g) |
|---|---|---|---|
| 1 | 30 | 70 | 0.32 |
| 2 | 60 | 80 | 0.45 |
| 3 | 90 | 85.1 | 0.52 |

EXAMPLE 2

2,6-Xylenol is polymerized as in Example 1. Samples are collected at the end of the addition of 2,6-xylenol and during the subsequent period of time, at intervals of 30 minutes.

Each drawn sample of 2.6 ml is placed inside an Erlenmeyer flask, 20 ml of trichloroethylene are added, and the mixture is agitated until the polyphenyleneoxide present is completely dissolved, and a clear and homogeneous solution is obtained.

The solution so obtained is placed within a Ubbelhode viscometer No. 1, thermostatized at 23°±0.2° C., and the passage time of the solution being examined through the capillary tube is measured. The passage time of the solvent, for this particular type of viscometer, is of 43.6 seconds.

The solution of the sample collected 90 minutes after the completion of the addition of 2,6-xylenol shows a through time of 82.2 seconds.

The polyphenyleneoxide has an intrinsic viscosity of 0.52 dl/g, obtained from standard data.

We claim:

1. Process for the production of polyphenyleneoxide which comprises:
    (a) feeding oxygen, or a gas containing molecular oxygen, a catalyst which comprises a cupric salt complexed with an organic base and 2,6-xylenol, into a liquid reaction medium, which is a solvent for said 2,6-xylenol and said catalyst but is not a solvent or substantially not a solvent for polyphenyleneoxide;
    (b) withdrawing samples during the reaction and treating said samples with a liquid solvent capable of dissolving said polyphenyleneoxide and of terminating polymerization:
    (c) measuring the passage time of the so obtained solution through a capillary tube viscometer and determining the viscosity or the molecular weight of polyphenyleneoxide by means of the comparison with standard values; and
    (d) terminating the oxidative polymerization reaction of 2,6-xylenol on the basis of the so determined value of the viscosity or of the molecular weight of polyphenyleneoxide.

2. Process as claimed in claim 1, characterized in that the catalyst is cupric chloride, the complexing organic base is pyridine, the reaction liquid medium is a blend of toluene and ethanol, and the reaction temperature is lower than about 30° C.

3. Process as claimed in claim 1, characterized in that the liquid solvent for the samples drawn from the reaction mixture is a chlorinated aliphatic hydrocarbon, or a mixture of an aromatic hydrocarbon with at least 1% by weight of hydrochloric acid or of acetic acid.

4. Process as claimed in claim 3, characterized in that said liquid solvent is tetrachloroethylene or chloroform.

5. Process as claimed in claim 1, characterized in that the sample drawn from the reaction mixtures is mixed with a quantity of from 10 to 20 parts by volume per each part by volume of the sample.

6. Process as claimed in claim 5, characterized in that one part by volume of the sample collected is mixed with about 10 parts by volume of liquid solvent.

* * * * *